United States Patent
Meiskey et al.

(10) Patent No.: US 9,251,267 B2
(45) Date of Patent: Feb. 2, 2016

(54) GENERATING BEHAVIOR INFORMATION FOR A LINK

(75) Inventors: Lori D. Meiskey, Zurich (CH); Jana S. Urban, Zurich (CH)

(73) Assignee: GOOGLE INC., Mountain View, CA (US)

( * ) Notice: Subject to any disclaimer, the term of this patent is extended or adjusted under 35 U.S.C. 154(b) by 511 days.

(21) Appl. No.: 12/895,341

(22) Filed: Sep. 30, 2010

(65) Prior Publication Data

US 2012/0084630 A1    Apr. 5, 2012

(51) Int. Cl.
G06F 17/00    (2006.01)
G06F 17/30    (2006.01)

(52) U.S. Cl.
CPC .................. *G06F 17/30867* (2013.01)

(58) Field of Classification Search
CPC ............... G06F 17/30014; G06F 17/30867
USPC ......................................................... 715/205
See application file for complete search history.

(56) References Cited

U.S. PATENT DOCUMENTS

| | | | |
|---|---|---|---|
| 6,519,617 B1 * | 2/2003 | Wanderski et al. ........... | 715/235 |
| 7,458,014 B1 * | 11/2008 | Rubin et al. .................. | 715/229 |
| 8,255,786 B1 * | 8/2012 | Gattani et al. ............... | 715/205 |
| 8,806,326 B1 * | 8/2014 | Leppinen ...................... | 715/234 |
| 2002/0073165 A1 * | 6/2002 | McNulty et al. .............. | 709/217 |
| 2003/0167334 A1 * | 9/2003 | Butler ........................... | 709/227 |
| 2007/0157083 A1 * | 7/2007 | Roy et al. ..................... | 715/522 |
| 2009/0327855 A1 * | 12/2009 | Le ................................. | 715/230 |

* cited by examiner

*Primary Examiner* — Kavita Padmanabhan
*Assistant Examiner* — Zaida I Marrero
(74) *Attorney, Agent, or Firm* — Marshall, Gerstein & Borun LLP

(57) ABSTRACT

A computer-implemented method includes receiving a request for a web page; retrieving information associated with the web page, wherein the information comprises a link and one or more link placeholders associated with the link; determining context information associated with the computing device; generating, based on the context information, behavior information for the link; and populating at least one of the one or more link placeholders with the behavior information.

18 Claims, 9 Drawing Sheets

GENERATING BEHAVIOR INFORMATION FOR A LINK

TECHNICAL FIELD

This document relates generally to generating links for a web page based on run-time context information, such as a type of device displaying the web page and/or a type of application in which the web page is displayed.

BACKGROUND

Generally, a web page is based on Hypertext Markup Language ("HTML") code, which provides the ability to display "links" in the web page. The term "link" refers to a segment of text or a graphical item that serves as a cross-reference between parts of a web page and/or between web pages. For example, through selection of a link, a viewer of a web page is able to navigate to a new web page.

A link may be associated with "link information." Generally, link information refers to information associated with a link. For example, link information may include target address information. A target address generally refers to an address that is loaded by a web browser and/or an application, for example, upon selection of a link. Link information may also include information specifying a behavior for the link ("behavior information"), including, e.g., how the link is displayed, whether a selection of the link launches a new application and/or a new browser window, whether alert messages are generated upon selection of the link, and so forth. Link information may also include information specifying whether a web page associated with a link is opened in a new browser window or is opened through "tabbed browsing" in an existing browser window. Generally, tabbed browsing refers to a function of some web browsers that allows a user to view multiple web pages in a single browser window by loading a web page into a section (referred to as a "tab") of the browser window, rather than in multiple browser windows.

The behavior of a link may depend on a type of device in which the link is displayed. For example, the type of link behaviors supported by a mobile device may differ from the type of link behaviors support by a laptop computer. In an example, a mobile device may not support tabbed browsing. In such a mobile device, a displayed link cannot be associated with tabbed browsing behavior.

SUMMARY

In one aspect of the present disclosure, a computer-implemented method includes receiving, from a computing device, a request for a web page; retrieving information associated with the web page, wherein the information includes a link and one or more link placeholders associated with the link; determining context information associated with the computing device; generating, based on the context information, behavior information for the link; and populating at least one of the one or more link placeholders with the behavior information.

Implementations of the disclosure may include one or more of the following features. In some implementations, the context information includes one or more of (i) a type of computing device that requested the web page, (ii) a target address associated with at least one of the one or more link placeholders, (iii) a placement of at least one of the one or more link placeholders in a graphical user interface associated with the web page, and (iv) a display mode associated with the web page. The method may also include parsing the request to generate the context information associated with the computing device.

In other implementations, the method includes retrieving one or more link generation rules, wherein the one or more link generation rules include instructions that specify a behavior for the link; and applying at least one of the one or more link generation rules to generate the behavior information for the link. The method may also include updating at least one of the one or more link generation rules with new instructions specifying the behavior of the link. The method may additionally include generating code based on a type of computing device that renders the link, wherein the code includes information that specifies a behavior of the link.

In another aspect of the disclosure, one or more machine-readable media are configured to store instructions that are executable by one or more processing devices to perform functions including receiving a request for a web page; retrieving information associated with the web page, wherein the information includes a link and one or more link placeholders associated with the link; determining context information associated with the computing device; generating, based on the context information, behavior information for the link; and populating at least one of the one or more link placeholders with the behavior information. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform functions including: receiving a request for a web page; retrieving information associated with the web page, wherein the information includes a link and one or more link placeholders associated with the link; determining context information associated with the computing device; generating, based on the context information, behavior information for the link; and populating at least one of the one or more link placeholders with the behavior information. Implementations of this aspect of the present disclosure can include one or more of the foregoing features.

In yet another aspect of the disclosure, an electronic system includes means for receiving a request for a web page; retrieving information associated with the web page, wherein the information includes a link and one or more link placeholders associated with the link; determining context information associated with the computing device; generating, based on the context information, behavior information for the link; and populating at least one of the one or more link placeholders with the behavior information. Implementations of this aspect of the present disclosure can include one or more of the foregoing features.

In still another aspect of the disclosure, a computer-implemented method includes receiving, from a computing device, a request for a web page; retrieving information associated with the web page, wherein the information includes a link and one or more link placeholders associated with the link, and wherein the one or more link placeholders include an area of the web page to be populated with behavior information for the link; determining context information associated with the computing device, wherein the context information includes one or more of (i) information specifying a type of computing device in which the link is rendered, and (ii) information specifying a type of application in which the link is rendered; generating, based on the context information, the behavior information for the link, wherein the behavior information includes one or more of (i) information specifying how the link should be displayed, (ii) information specifying how a target address associated with the link should be displayed, and (iii) information specifying one or more events associated with the link; and populating at least one of the one or more link placeholders with the behavior information. Implementations of this aspect of the present disclosure can include one or more of the foregoing features.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
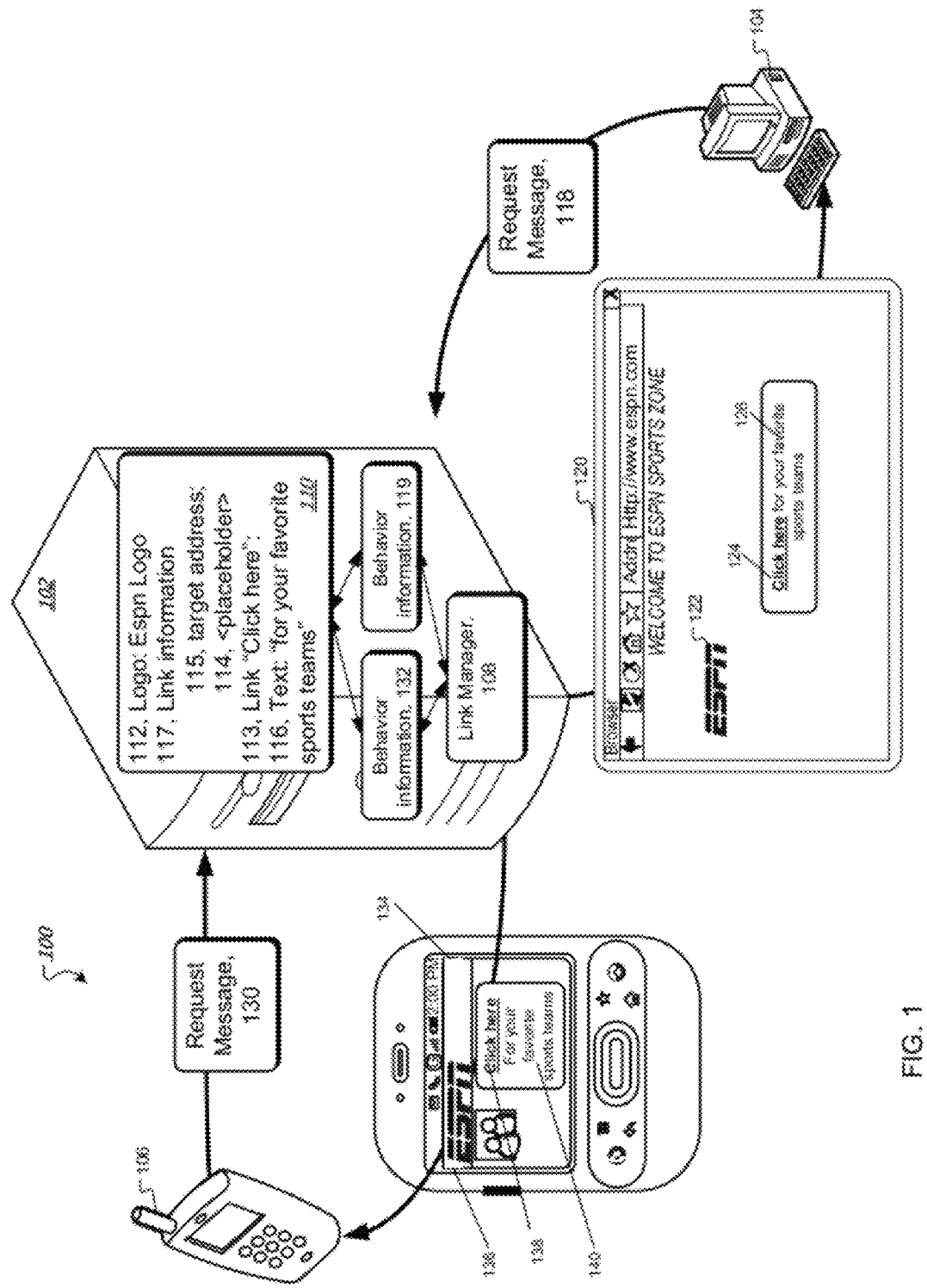
FIG. 1 is a conceptual diagram of a system for determining a behavior of a link.

Described herein is a system that dynamically determines the behavior of a link based on "context information." Generally, context information refers to information specifying a "context" (e.g., a type of computing device and/or a type of application) in which a link is displayed. That is, a behavior of a link may vary based on a context in which the link is displayed. By determining a context in which a link is displayed, the system is able to generate information specifying an appropriate behavior for the link.

In an example, context information may include information specifying that a link is displayed on a mobile device, a laptop computer, a personal computer, and so forth. In another example, context information may include information specifying that a link is displayed in a web browser, a map application, or any other application that may be running on a computing device. In yet another example, different contexts may be specified for single application running on a device. For example, behavior of a link in a left-hand search results panel of a search application may be different from behavior of the same link in a different panel and/or view of the search application, for example, within a details view for a single geographic location.

Context information may also include display mode information. Display mode information refers to information indicative of a "display mode," namely, how textual information associated with a link is displayed. For example, a display mode may allow a user to specify whether textual information associated with a link is displayed as highlighted text, as a "pop-up" image, and so forth.

Context information may also include target address information. In an example, a target address is an external address, including, e.g., an address that is not associated with a web page in which the link is displayed. In this example, content associated with the target address is loaded in a new browser window. In another example, a target address is an internal address, including, e.g., an address that is associated with a web page in which the link is displayed. In this example, content associated with the target address is loaded in an existing browser window.

Context information may also include UI information. Generally, UI information refers to information specifying elements (e.g., graphics, text, headers, and so forth) included in a UI. In an example, an element includes a link. In this example, the behavior of the link may be based on a placement of the link within the element. Accordingly, the UI information includes information specifying a placement of the link within the element. In another example, an element includes numerous links. In this example, the behavior of a particular link may be based on an order of the link among the numerous links. Accordingly, UI information includes information specifying an order of the link among the numerous links.

Context information may also include information specifying a uniform resource location ("URL") associated with a link. Context information may also include textual information associated with the link, for example, text that may be surrounding the link.

FIG. 1 is a conceptual diagram of system 100 for determining behavior of a link. System 100 includes server 102 and client devices 104, 106. Server 102 includes link manager 108, which is configured to generate link information for a link. Server 102 also includes information indicative of web page 110.

In the example of FIG. 1, web page 110 includes information specifying how contents of web page 110 are displayed, for example, on client devices 104, 106. Specifically, web page 110 includes logo 112, link 113, and text 116. Link 113 is associated with link information 117. Link information 117 includes target address 115 and link placeholder 114. Link placeholder 114 includes a placeholder for the insertion of behavior information associated with link 113. As described in further detail below, link manager 108 generates behavior information 119,132 for link 113 and populates link placeholder 114 with the generated behavior information.

In the example of FIG. 1, client device 104 sends request message 118 to server 102. Request message 118 includes a request for web page 110. In response to request message 118, link manager 108 determines context information associated with client device 104. In an example, link manger 108 determines that client device 104 is a personal computing device and that client device 104 is running a web browser that supports tabbed browsing.

Based on the determined context information for client device 104, link manager 108 generates behavior information 119 for link 113 when rendered on client device 104. Specifically, behavior information 119 includes instructions to implement tabbed browsing to launch target address 115 in a new tab in the browsing application that displays web page 110.

In the example of FIG. 1, link manager 108 populates link placeholder 114 with behavior information 119 and generates UI 120, which includes behavior information 119. Specifically, in code associated with UI 120, link 113 is associated with behavior information 119. UI 120 includes visual representation 122 of logo 112, visual representation 124 of link 113, and visual representation 126 of text 116. Server 102 sends UI 120 to client device 104.

A selection of visual representation 124 of link 113, for example by a user of client device 104, causes client device 104 to execute behavior information 119. Specifically, a selection of visual representation 124 of link 113 causes a web browser running on client device 104 to open a new tab in an existing web browser and to display in the new tab the contents of target address 115 associated with link 113.

In the example of FIG. 1, client device 106 sends request message 130 to server 102. Request message 130 also includes a request for web page 110. In response to request message 130, link manager 108 determines context information associated with client device 106. In an example, link manger 108 determines that client device 106 is a mobile device that is running a web browser that does not support tabbed browsing.

Based on the determined context information for client device 106, link manager 108 generates behavior information 132 that specifies a behavior for link 113 when rendered on client device 106. Specifically, behavior information 132 includes instructions to launch the contents of target address 115 in the same web browser that displays web page 110.

In the example of FIG. 1, link manager 108 populates link placeholder 114 with behavior information 132. Server 102 generates UI 134, which includes behavior information 132. Specifically, UI 134 includes visual representation 136 of logo 112, visual representation 138 of link 113, and visual representation 140 of text 116. Server 102 sends UI 134 to client device 106. A selection of visual representation 136 of link 113, for example by a user of client device 106, causes client device 106 to implement behavior information 132. Specifically, a selection of visual representation 136 of link 113 causes a web browser running on client device 106 to launch the contents of target address 115 in the same web browser that displays UI 134.

Figure 2:
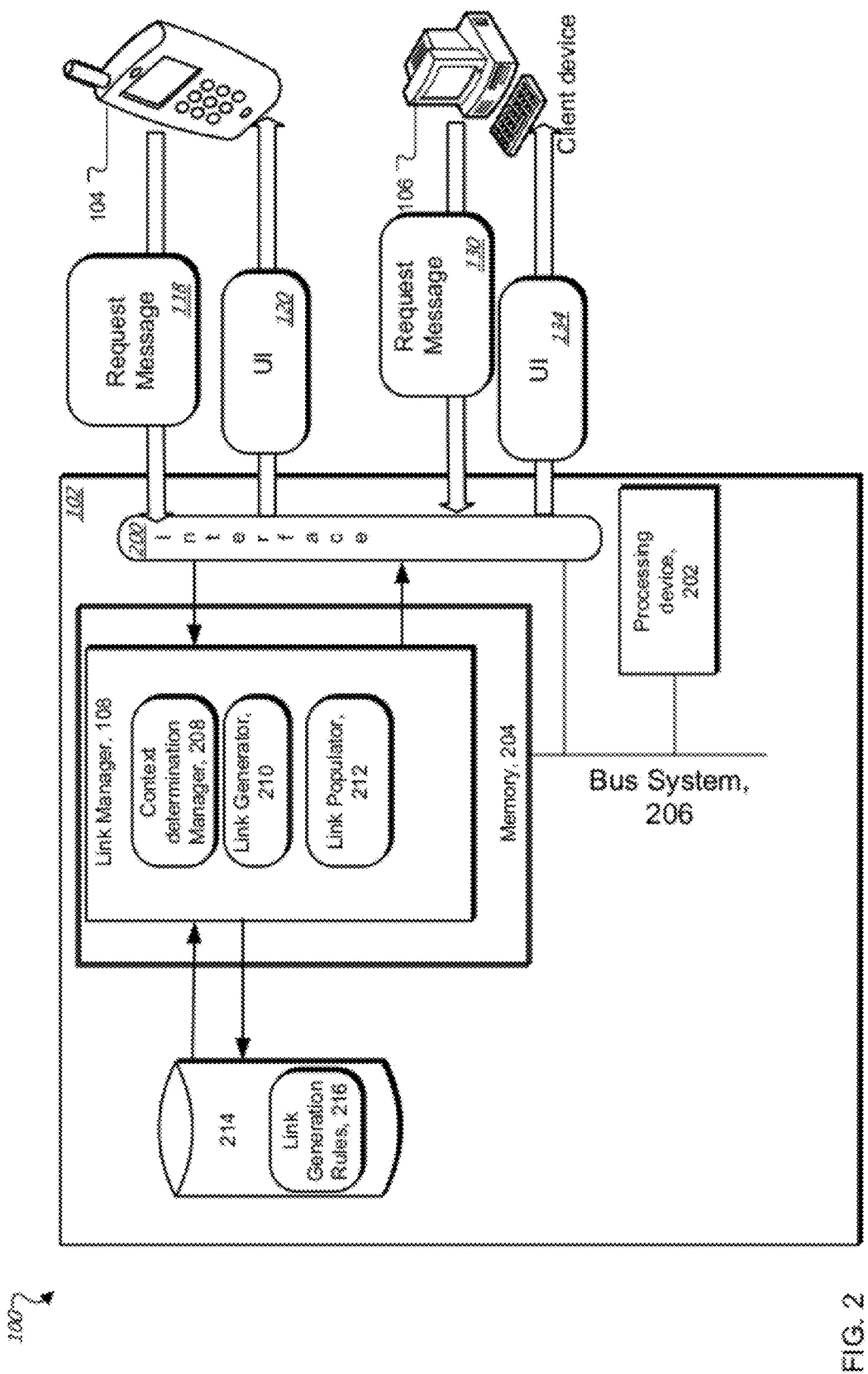
FIG. 2 is a block diagram of components of the system for determining the behavior of the link.

FIG. 2 is a block diagram of components of system 100 for determining the behavior of link 113. In FIG. 2, web page 110, logo 112, link 113, text 116, link information 117, behavior information 119, 132, and visual representations 122, 124, 126, 136, 138, 140 are not shown.

Client devices 104, 106 can be any sort of computing devices capable of taking input from a user and communicating over a network (not shown) with server 102 and/or with other client devices. For example, client devices 104, 106 can be mobile devices, desktop computers, laptops, cell phones, personal digital assistants ("PDAs"), servers, embedded computing systems, and so forth. Server 102 can be any of a variety of computing devices capable of receiving information, such as a server, a distributed computing system, a desktop computer, a laptop, a cell phone, a rack-mounted server, and so forth. Server 102 may be a single server or a group of servers that are at a same location or at different locations.

Server 102 can receive information from client devices 104, 106 via input/output ("I/O") interface 200. I/O interface 200 can be any type of interface capable of receiving information over a network, such as an Ethernet interface, a wireless networking interface, a fiber-optic networking interface, a modem, and so forth. Server 102 also includes a processing device 202 and memory 204. A bus system 206, including, for example, a data bus and a motherboard, can be used to establish and to control data communication between the components of server 102.

Processing device 202 may include one or more microprocessors. Generally speaking, processing device 202 may include any appropriate processor and/or logic that is capable of receiving and storing data, and of communicating over a network (not shown). Memory 204 can include a hard drive and a random access memory storage device, such as a dynamic random access memory, or other types of non-transitory machine-readable storage devices. As shown in FIG. 2, memory 204 stores computer programs that are executable by processing device 2202. Among these computer programs are context determination manager 208, link generator 210, and link populator 212, each of which are described in further detail below.

Context determination manager 208 is configured to receive a request message (e.g., request messages 118, 130) and to determine context information associated with the client device sending a request message. For example, a request message may include information specifying a type of computing device that is sending the request message. In another example, a request message may include information specifying a type of application that is running on a client device.

To generate context information, context determination manager 208 may retrieve context rules (not shown) from data repository 214. Context rules may specify appropriate context information for numerous types of applications and/or types of computing devices.

In an example, a request message includes information specifying that the request message is being sent by a laptop computer that is running a particular type of web browser. In this example, context determination manager 208 may retrieve a context rule that specifies that the particular type of web browser supports tabbed browsing when the web browser is run on a laptop computer. Based on an application of the context rule to the information included in the request message, context determination manager 208 determines context information for the laptop computer, namely, that the web browser running on the laptop computer supports tabbed browsing.

Context determination manager 208 may also generate context information based on the contents of a web page in which a link is displayed. Referring back to FIG. 1, context determination manager 208 may generate context information based on text 116 included in web page 110. Additionally, context determination manager 208 may generate context information based on a placement of link 113 in web page 110. For example, in web page 110, link 113 is placed between logo 112 and text 114. Based on this placement, context determination manager 208 may determine that link 113 does not support certain behaviors, for example an "onclick" event, which captures a click event from a user's mouse button.

Link manager 108 also includes link generator 210. Link generator 210 is configured to generate behavior information 119, 132, for example, based on context information generated by context determination manager 208. In the example of FIG. 2, data repository 214 includes link generation rules 216. Link generation rules 216 include instructions that define a behavior for a link based on context information associated with the link. Link generator 210 executes link generation rules 216 to generate behavior information, including, e.g., behavior information 119, 132. Link generator 210 may also be configured to retrieve information indicative of target address 115 from data repository 214 and to insert the information indicative of target address 115 into link information 117.

In an example, context information specifies that link 113 is displayed on client device 104, which is a personal computer running a particular type of web browser. In this example, a link generation rule specifies that the particular type of web browser supports tabbed browsing and onclick events. Specifically, the link generation rule may include instructions to generate HTML code that corresponds to an onclick event and tabbed browsing. Link generator 210 applies the link generation rule to generate behavior information, namely information specifying the onclick event and tabbed browsing, for link 113.

Link manager 108 also includes link populator 212. Link populator 212 is configured to populate link placeholder 114 with behavior information generated by link generator 210. Once link populator 212 has populated link placeholder 114 with behavior information, server 102 may generate a complete version of a web page, for example, UIs 120, 132 of web page 110.

Figure 3:
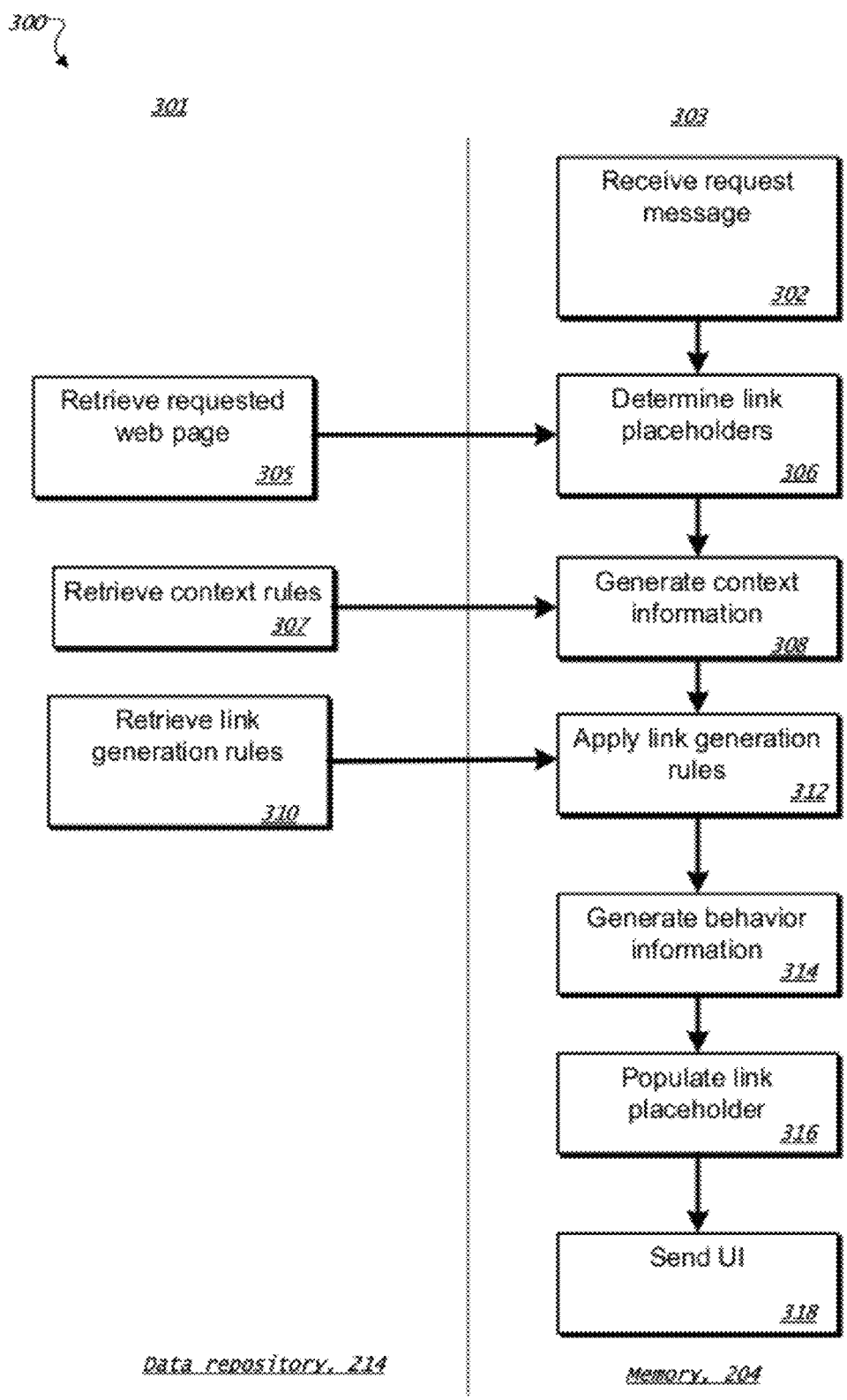
FIG. 3 is a flowchart of a process performed by a link manager for determining the behavior of the link.

FIG. 3 is a flowchart of process 300 performed by link manager 108 for determining the behavior of a link. In FIG. 3, process 300 is split into a left part 301, which is performed on data repository 214 by link manager 108, and a right part 303, which is performed on memory 204 by link manager 108.

In operation, context determination manager 208 receives (302) request messages 118, 130. Based on information included in request messages 118, 130, context determination manager 208 determines (not shown) that web page 110 is requested by client devices 104, 106 and retrieves (305) web page 110 from data repository 214. Context determination manager 208 determines (306) that web page 110 includes link placeholder 114. Context determination manager 208 retrieves (307) from data repository 214 context rules. Based on an application of the context rules to information included in and/or associated with request messages 118, 130, context determination manager 208 generates (308) context information for client devices 104, 106. Context determination manager 208 passes (not shown) the generated context information to link generator 210.

Link generator 210 retrieves (310) from data repository 214 link generation rules 216. Link generator 210 applies (312) link generation rules 216 to context information and generates (314) behavior information 119, 132. Link generator 210 passes (not shown) behavior information 119, 132 to link populator 212. Link populator 212 populates (316) link placeholder 114 with behavior information 119, 132.

In an example, link populator 212 may iteratively populate link placeholder 114 with link information. For example, link populator 212 may populate link placeholder 114 with behavior information 119. Server 102 may then generate UI 120. Server 102 may then flush behavior information 119 from link placeholder 114. Link populator 212 may then populate link placeholder 114 with behavior information 132.

Link manager 108 compiles (not shown) web page with behavior information 119 or behavior information 132 inserted into link placeholder 114. Based on the compilation, link manager 108 generates (not shown) UIs 120, 132. Link manager 108 sends (318) UIs 120, 132 to client devices 104, 106.

In a variation of FIG. 3, link generation rules 216 are stored in running code for link manager 108, rather than being retrieved from data repository 214. In yet another variation of FIG. 3, the actions 305, 307, 310 of left part 301 are also performed by memory 204.

Figure 4:
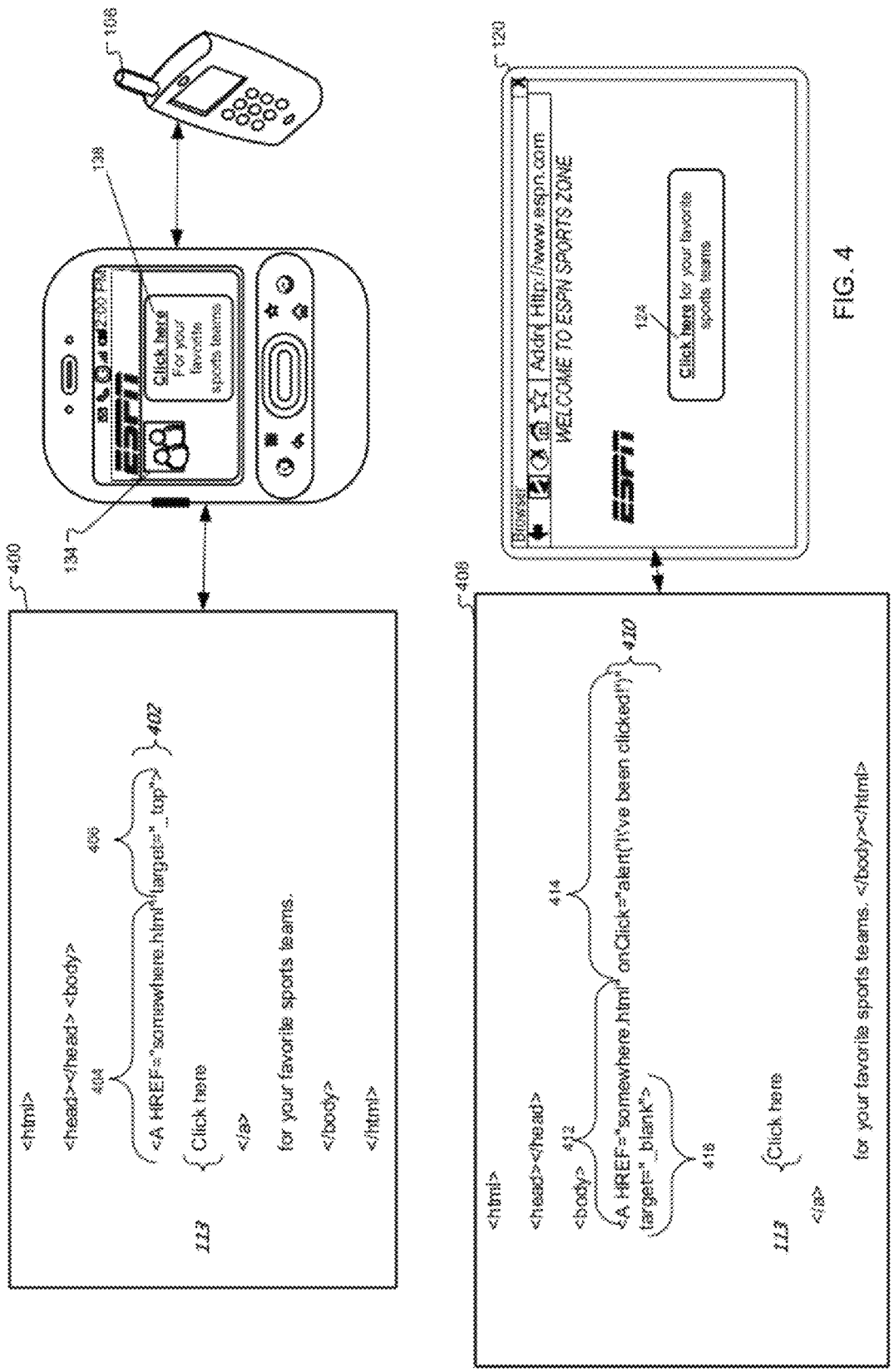
FIG. 4 shows an example of link information generated by the link manager.

FIG. 4 shows an example of link information generated by link manager 108. Specifically, code 400 represents HTML code corresponding to UI 134. Code 400 includes link information code 402, which includes HTML code corresponding to target address 115 and behavior information 132 (FIG. 1) for link 113. Specifically, link information code 402 includes instructions that specify a behavior of link 113 upon a selection of visual representation 134, for example, by a user of client device 106.

In the example of FIG. 4, context information associated with client device 106 includes information specifying that client device 106 is a mobile device running a web browser that does not support tabbed browsing. In this example, link information code 402 includes two elements, element 404 and element 406. Element 404 includes information specifying a target address for link 113. Element 406 includes instructions (e.g., target="_top") corresponding to behavior information 132 for link 113 when rendered on client device 106, namely, that a selection of link 113 from client device 106 launches the target address in the same browsing window that displays UI 134.

Code 408 represents HTML code corresponding to UI 120. Code 408 includes link information code 410, which includes HTML code corresponding to target address 115 and behavior information 119 for link 113 when rendered on client device 104 (FIG. 1). That is, link information code 410 includes instructions that specify a behavior of link 113 upon a selection of visual representation 126, for example, by a user of client device 104.

In the example of FIG. 4, context information associated with client device 104 includes information specifying that client device 104 is a personal computing device running a web browser that supports tabbed browsing. Accordingly, link information code 408 includes three elements, namely, elements 412, 414, 416. Element 412 includes information specifying a target address for link 113. Elements 414, 416 include instructions corresponding to behavior information 119 for link 113 when rendered on client device 104. Specifically, element 414 represents an "onclick event." That is, upon a selection of visual representation 124 of link 113, element 414 causes a display of an alert message, namely, an "I've been clicked!" message. Element 416 (e.g., target="_blank") specifies that a selection of visual representation 124 of link 113 launches target address 115 in a new tab of the same browsing window that displays UI 120.

Figure 5:
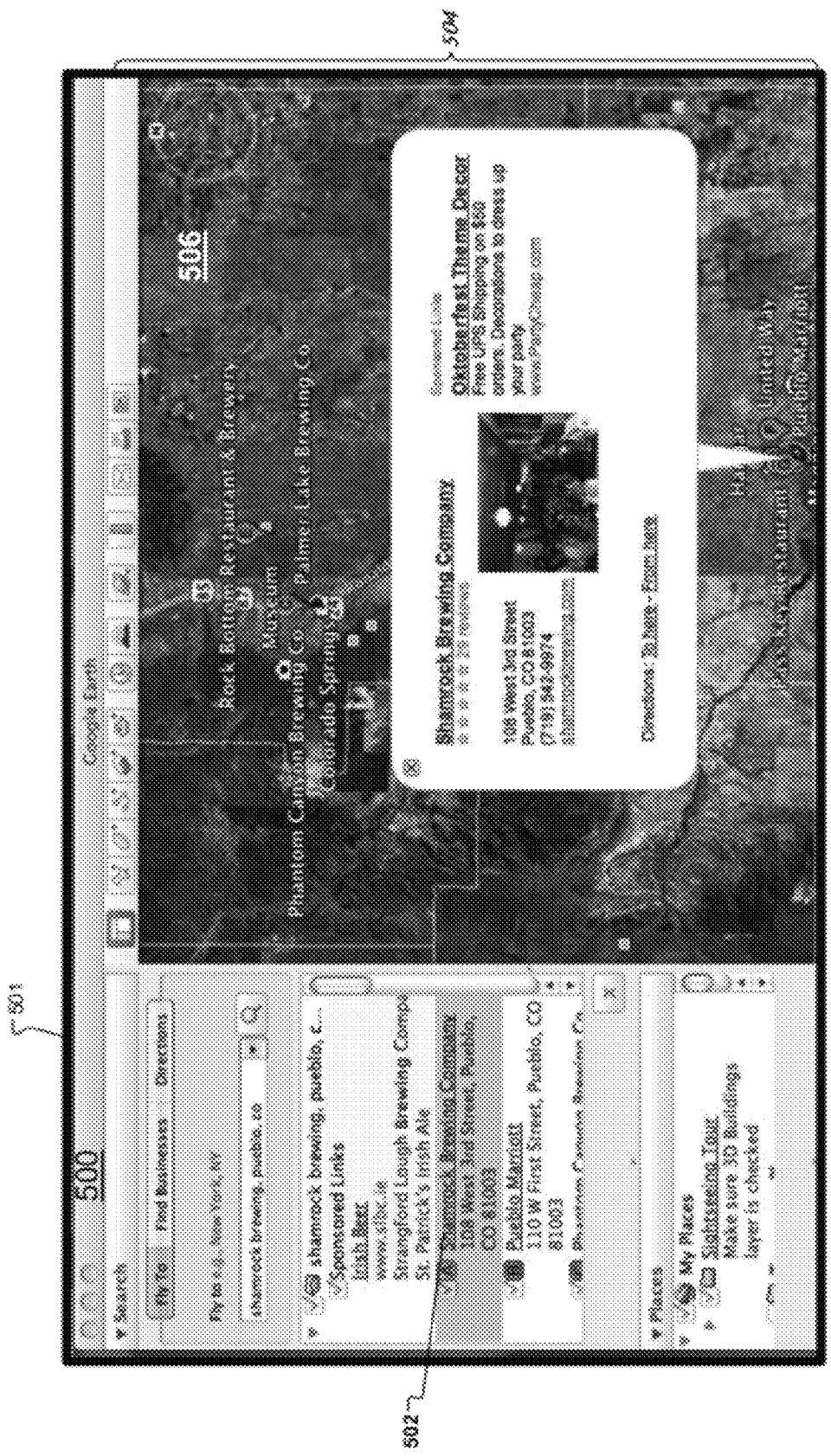
FIG. 5 shows an example of a user interface ("UI") of a mapping application

FIG. 5 is an example of UI 500 of a mapping application. UI 500 is displayed in browser window 501. UI 500 includes link 502. UI 500 also includes section 504, which displays content 506 associated with the mapping application.

In the example of FIG. 5, a client device loads the mapping application, for example, by sending a request for the mapping application to server 102. Server 102 sends UI 500 to the client device. When the client device requests the mapping application, link generator 210 uses the techniques described herein to generate (e.g., in real-time) behavior information (not shown) for link 502. Specifically, the behavior information for link 502 specifies that when link 502 is selected that the contents of the target address associated with link 502 are displayed in section 504 of UI 500 in browser window 501.

Figure 6:
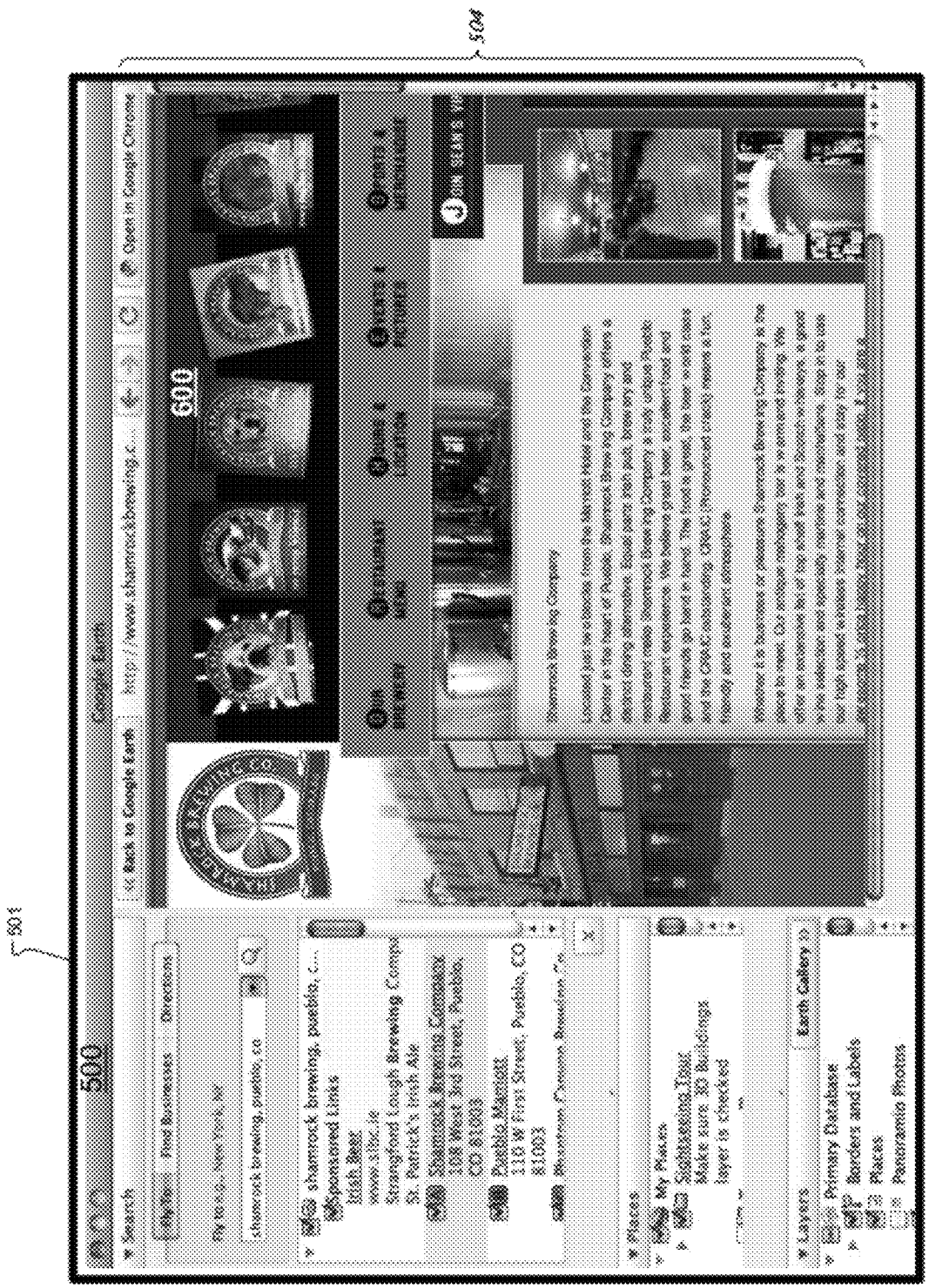
FIG. 6 shows an example of the UI of the mapping application illustrated in FIG. 5 upon a selection of a link.

FIG. 6 is an example of UI 500 upon a selection of link 502. Specifically, UI 500 includes section 504, which displays contents 600 of the target address of link 502. In the example of FIG. 6, a selection of link 502 (FIG. 5) causes the mapping application to load content 600 into section 504 of UI 500 in browser window 501.

Figure 7:
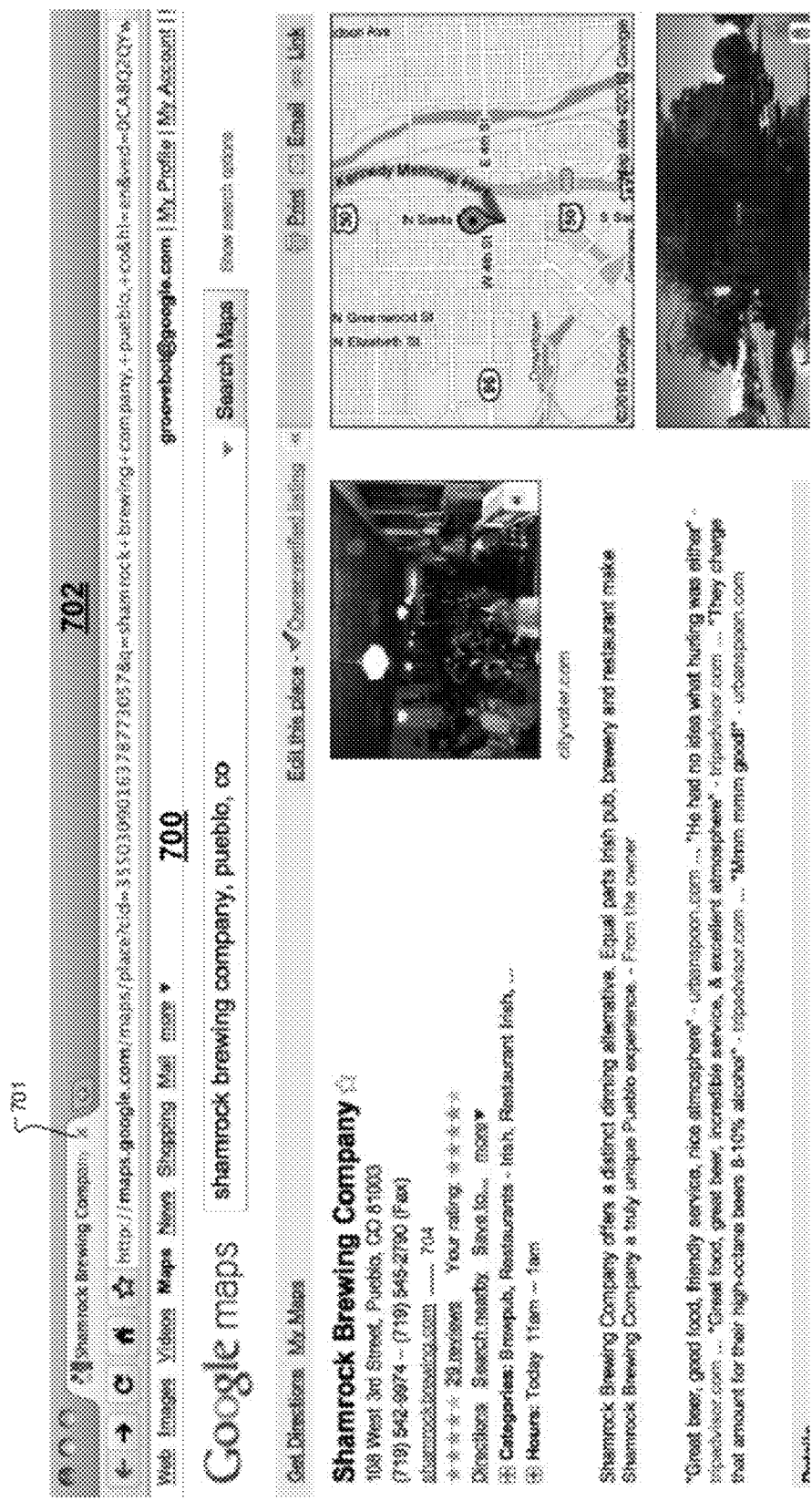
FIG. 7 shows an example of a website displayed in a tab of a browser window.

FIG. 7 is an example of website 700 displayed in tab 701 of browser window 702. Website 700 includes link 704. In the example of FIG. 7, a client device loads website 700, for example, by sending a request for website 700 to server 102. When the client device requests website 700, link generator 210 uses the techniques described herein to generate (e.g., in real-time) behavior information (not shown) for link 704. Specifically, the behavior information for link 704 specifies that when link 704 is selected that the contents of the target address associated with link 704 are displayed in another tab of browser window 702.

Figure 8:
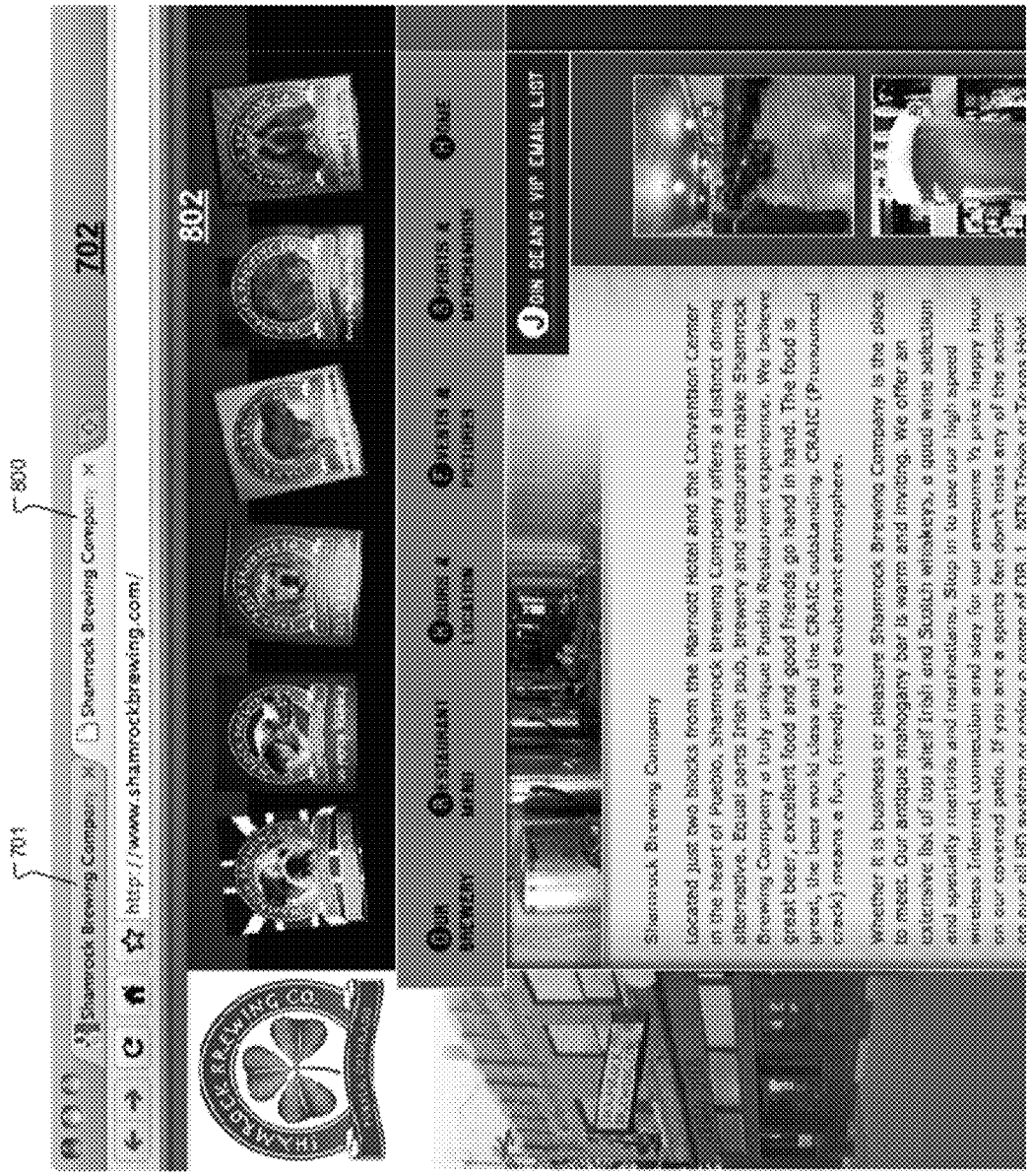
FIG. 8 shows an example of the browser window upon a selection of a link in the website illustrated in FIG. 7.

FIG. 8 is an example of browser window 702 upon a selection of link 704 in website 700. Specifically, upon a selection of link 704, browser window 702 launches tab 800, which displays content 802 of the target address of link 704.

Using the techniques described herein, information specifying a behavior of links in a web page and/or an application is generated in real-time based on context information associated with a computing device that displays the link.

Figure 9:
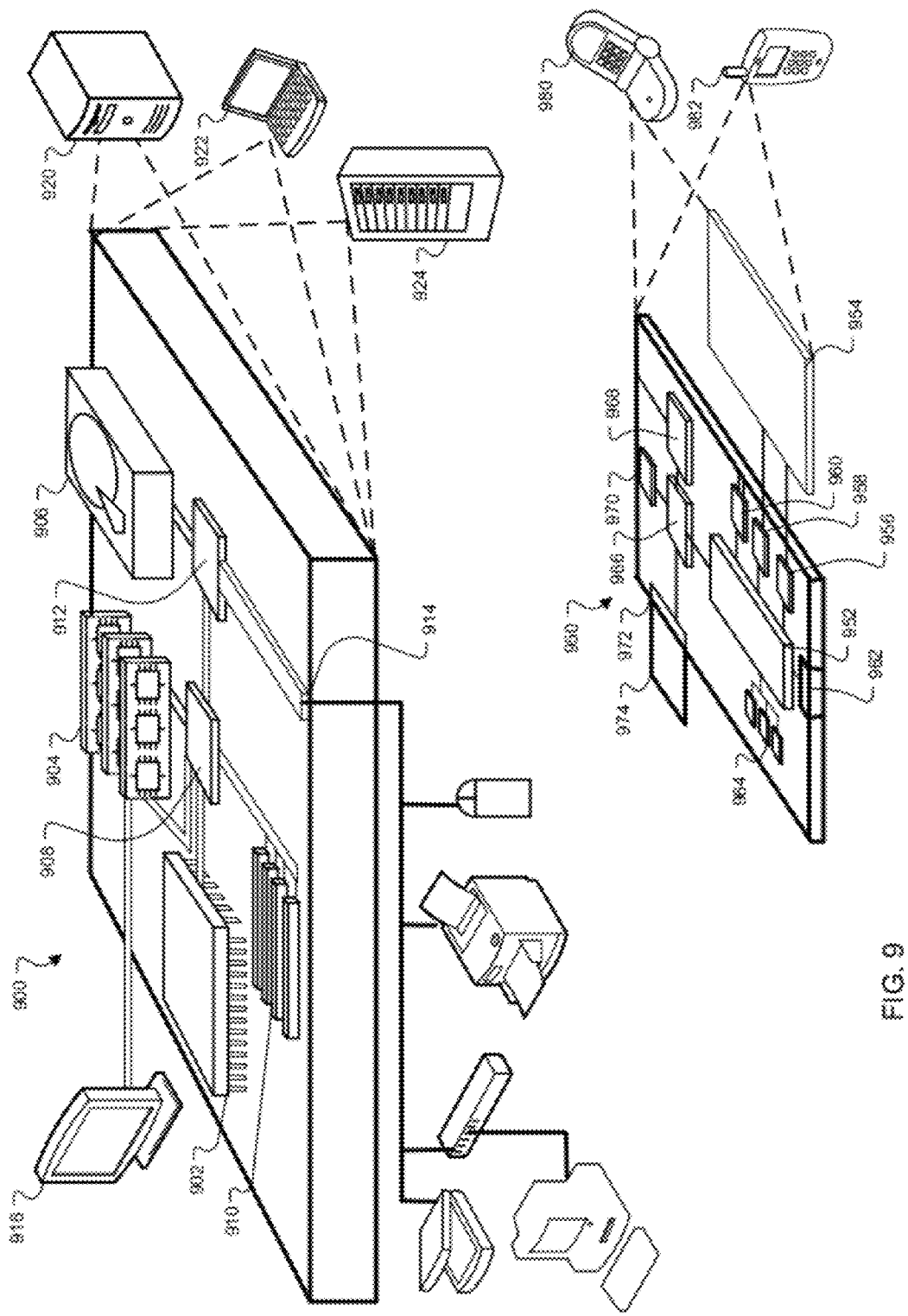
FIG. 9 shows an example of a computer device and a mobile computer device that can be used to implement the techniques described herein.

FIG. 9 shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is an example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 570 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, and so forth) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the processes and techniques described herein. For example, link manager 108 may be further configured to generate behavior information that includes javascript instructions that are executed upon a selection of a link.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims. Although a few implementations have been described in detail above, other modifications are possible. Moreover, other mechanisms for editing voice may be used. In addition, the logic flows depicted in the figures do not require the particular order shown, or sequential order, to achieve desirable results.

Other steps may be provided, or steps may be eliminated, from the described flows, and other components may be added to, or removed from, the described systems. Accordingly, other embodiments not specifically described herein are also within the scope of the following claims.

What is claimed is:

1. A computer-implemented method comprising:
receiving, from a computing device, a request for at least part of a webpage, the request including user device information, wherein the at least part of the web page includes (i) a target address corresponding to a link and (ii) a link placeholder to be replaced with an indication of how content associated with the link is to be displayed upon selection of the link;
determining context information associated with the request based on the user device information included with the request;
identifying a link rule based on the context information;
obtaining, based on the link rule, html code specifying a value for an attribute titled target to control how content associated with the link is to be displayed upon selection of the link, wherein the value of the attribute in the obtained html code depends on the user device information included with the request;
inserting the html code into the at least part of the webpage by replacing the link placeholder to generate a modified at least part of the webpage; and
serving the modified at least part of the webpage to the computing device for display.

2. The method of claim 1, wherein the value of the attribute is set to _blank in response to a determination that the computing device supports tabbed browsing.

3. The method of claim 1, wherein the value of the attribute is set to _top in response to a determination that the computing device does not support tabbed browsing.

4. The method of claim 1, wherein the modified at least part of the webpage is displayed in a web browser window, and wherein the html code specifies that the content associated with the link is to be displayed in a new web browser window upon selection of the link.

5. The method of claim 1, wherein the modified at least part of the webpage is displayed in an a first tab window of a web browser, and wherein the html code specifies that the content associated with the link is to be displayed in a second tab window of the web browser upon selection of the link.

6. The method of claim 1, wherein the at least part of the modified webpage is configured to be rendered for display by the computing device such that the displayed webpage includes a display of the link to the content and, upon selection of the link by a user, the content is displayed in accordance with the html code inserted into the webpage.

7. A non-transitory computer readable storage medium comprising program instruction stored thereon that are executable by one or more processors to cause the one or more processors to perform the following steps:
receiving, from a computing device, a request for at least part of a webpage, the request including user device information, wherein the at least part of the web page includes (i) a target address corresponding to a link and (ii) a link placeholder to be replaced with an indication of how content associated with the link is to be displayed upon selection of the link;
determining context information associated with the request based on the user device information included with the request;
identifying a link rule based on the context information;
obtaining, based on the link rule, html code specifying a value for an attribute titled target to control how content associated with the link is to be displayed upon selection of the link, wherein the value of the attribute in the obtained html code depends on the user device information included with the request;
inserting the html code into the at least part of the webpage by replacing the link placeholder to generate a modified at least part of the webpage; and
serving the modified at least part of the webpage to the computing device for display.

8. The medium of claim 7, wherein the value of the attribute is set to _blank in response to a determination that the computing device supports tabbed browsing.

9. The medium of claim 7, wherein the value of the attribute is set to _top in response to a determination that the computing device does not support tabbed browsing.

10. The medium of claim 7, wherein the at least part of the modified webpage is displayed in a web browser window, and wherein the html code specifies that the content associated with the link is to be displayed in a new web browser window upon selection of the link.

11. The medium of claim 7, wherein the at least part of the modified webpage is displayed in an a first tab window of a web browser, and wherein the html code specifies that the content associated with the link is to be displayed in a second tab window of a web browser upon selection of the link.

12. The medium of claim 7, wherein the at least part of the modified webpage is configured to be rendered for display by the computing device such that the displayed webpage includes a display of the link to the content and, upon selection of the link by a user, the content is displayed in accordance with the html code inserted into the webpage.

13. A system comprising:
one or more processors; and
one or more memory devices comprising program instructions that are executable by the one or more processors to cause the processors to perform steps comprising:
receiving, from a computing device, a request for at least part of a webpage, the request including user device information, wherein the at least part of the web page includes (i) a target address corresponding to a link and (ii) a link placeholder to be replaced with an indication of how content associated with the link is to be displayed upon selection of the link;
determining context information associated with the request based on the user device information included with the request;
identifying a link rule based on the context information;
obtaining, based on the link rule, html code specifying a value for an attribute title target to control how content associated with the link is to be displayed upon selection of the link, wherein the value of the attribute in the obtained html code depends on the user device information included with the request;
inserting the html code into the at least part of the webpage by replacing the link placeholder to generate a modified at least part of the webpage; and
serving the modified at least part of the webpage to the computing device for display.

14. The system of claim 13, wherein the value of the attribute is set to _blank in response to a determination that the computing device supports tabbed browsing.

15. The system of claim 13, wherein the value of the attribute is set to _top in response to a determination that the computing device does not support tabbed browsing.

16. The system of claim 13, wherein the at least part of the modified webpage is displayed in a web browser window, and wherein the html code specifies that the content associated with the link is to be displayed in a new web browser window upon selection of the link.

17. The system of claim 13, wherein the at least part of the modified webpage is displayed in an a first tab window of a web browser, and wherein the html code specifies that the content associated with the link is to be displayed in a second tab window of the web browser upon selection of the link.

18. The system of claim 13, wherein the at least part of the modified webpage is configured to be rendered for display by the computing device such that the displayed webpage includes a display of the link to the content and, upon selection of the link by a user, the content is displayed in accordance with the html code inserted into the webpage.

* * * * *